United States Patent [19]

Yoshii et al.

[11] Patent Number: 5,569,703

[45] Date of Patent: Oct. 29, 1996

[54] ADHESIVES

[75] Inventors: Yuuzi Yoshii; Yasuo Kaneshima; Masayoshi Nitta; Tatsuhiko Amano, all of Chiba, Japan

[73] Assignee: Sumitomo Chemical Company, Limited, Osaka, Japan

[21] Appl. No.: 403,581

[22] Filed: Mar. 14, 1995

Related U.S. Application Data

[63] Continuation of Ser. No. 44,495, Apr. 9, 1993, abandoned.

[30] Foreign Application Priority Data

Apr. 10, 1992 [JP] Japan ................................ 4-090768

[51] Int. Cl.$^6$ ................ C08L 31/02; C08L 31/04; C08L 23/08; C08L 33/14
[52] U.S. Cl. ................ 524/558; 524/503; 524/823; 526/316; 526/331; 156/327
[58] Field of Search ................ 524/558, 823, 524/503; 526/316, 331; 156/327

[56] References Cited

U.S. PATENT DOCUMENTS

| | | | |
|---|---|---|---|
| 4,189,415 | 2/1980 | Eck et al. | 524/503 |
| 4,365,040 | 12/1982 | Eck et al. | 524/823 |
| 4,421,889 | 12/1983 | Braun et al. | 524/559 |
| 4,532,295 | 7/1985 | Brabetz et al. | 526/227 |

*Primary Examiner*—Paul R. Michl
*Assistant Examiner*—Andrew E. C. Merriam
*Attorney, Agent, or Firm*—Sughrue, Mion, Zinn, Macpeak & Seas

[57] ABSTRACT

An adhesive comprising an aqueous emulsion of a copolymer containing an ethylene unit (A), a vinyl ester unit (B), and an acetoacetyl group-containing copolymerizable monomer unit (C) in a weight ratio of (A)/(B)/(C)=(5 to 70)/100/(0.1 to 10).

8 Claims, No Drawings

ADHESIVES

This is a Continuation of application Ser. No. 08/044,495 filed Apr. 9, 1993 now abandoned.

FIELD OF THE INVENTION

The present invention relates to an adhesive comprising an aqueous emulsion.

BACKGROUND OF THE INVENTION

Adhesives are generally classified into a solvent-type adhesive and an aqueous emulsion-type adhesive. In these adhesives, the solvent-type adhesive has the disadvantages of causing inflammation and fire, the hygienic problem, and environmental pollution, each caused by the solvent used. On the other hand, the aqueous emulsion-type adhesive does not have such disadvantages.

An aqueous emulsion-type adhesive is usually prepared by dispersing the fine particles of a water-insoluble resin having particle sizes of from about 0.05 to 10 μm in water as a medium. Accordingly, for improving the dispersibility of the fine particles of the resin in water, it is necessary that a hydrophilic component exists at the surface layer portions of the fine particles.

However, when such an aqueous emulsion-type adhesive is used, the hydrophilic component remains in the adhesive layer or film formed after adhesion and the layer containing such a hydrophilic component is poor in water resistance.

The following methods are known as methods for improving the water resistance of such an aqueous emulsion-type adhesive.

JP-A-56-93702 (the term "JP-A" as used herein means an "unexamined published Japanese patent application") discloses a method of using acetoacetylated polyvinyl alcohol as an emulsifier in the emulsion-polymerization of a vinyl compound in an aqueous medium. Further, JP-A-57-202364, JP-A-57-59971, and JP-A-58-24435 disclose a method of using an adhesive comprising an aqueous emulsion containing acetoacetylated polyvinyl alcohol as a protective colloid. However, in these techniques, the effect of improving the water resistance is insufficient.

A synthetic resin emulsion containing acetoacetylated polyvinyl alcohol as a protective colloid has a problem that the storage stability is poor and hence the emulsion (adhesive) is coagulated with the passage of time. JP-A-58-201837 discloses adding a hydrogensulfite to an aqueous emulsion-type adhesive to improve the storage stability of the emulsion but since an unpleasant odor (the odor of sulfur series compounds) due to the decomposition products of the hydrogensulfite occurs, there is inevitably a severe restriction for the use of such an adhesive.

JP-A-58-217571, JP-A-59-1581, JP-A-63-142079, JP-A-2-155975, JP-A-59-217780, and JP-A-59-161474 disclose a method of increasing the water resistance of an adhesive comprising an aqueous emulsion containing acetoacetylated polyvinyl alcohol as a protective colloid by mixing the aqueous emulsion with various kinds of modifiers such as an isocyanate series compound, an epoxy compound, a compound having a radical-forming ability, an oxidizing agent, etc.

However, since such a method has a short pot life (workable time), there is a problem that the restriction on the practical use is large.

As the techniques for covering the above disadvantage that the pot life of the mixtures is short, JP-A- 60-202176, JP-A-61-21171, JP-A-61-78883, and JP-A-60-240777 attempt to improve the pot life by using a two part type adhesive wherein the main component is coated on one surface of a material and the curing agent is coated on one surface of another material, and both the materials are bonded, causing a curing reaction (a honeymoon-type adhesive), or the main component and the curing agent are mixed immediately before use.

However, even the above techniques are, as a matter of course, restricted to the use under a specific condition and are unsuitable for the use of widely usable adhesives.

As a conventional technique relating to a synthetic resin emulsion prepared by copolymerizing an acetoacetyl group-containing copolymerizable monomer, a homopolymer of an emulsion-polymerizable unsaturated keto compound or a copolymer of the emulsion-polymerizable unsaturated keto compound and other copolymerizable monomer is used as described in German Patent Publication 1,495,704. JP-A-52-22030 also discloses use of a copolymer emulsion comprising an olefinically unsaturated monomer and a polymerizable acetoacetic acid ester as a coating material.

Examples of a combination of monomers are many combinations such as the combination of vinyl acetate and an acetoacetic acid allyl ester, etc., and in these examples, there is a combination of ethylene, vinyl acetate, and an acetoacetic acid allyl ester.

However, in JP-A-52-22030 described above, there are no descriptions of anticipating that in the case of using an ethylene-vinyl ester copolymer emulsion obtained by copolymerizing an acetoacetyl group-containing monomer having the specific composition as in the present invention, a high water resistance is obtained.

Also, JP-A-52-22085, JP-A-52-22086, and JP-A-53-2588 show use of a synthetic resin emulsion obtained by copolymerizing a polmerizable acetoacetic acid ester (e.g., acetoacetic acid allyl ester) in a polymer system in which the composition of various kinds of monomers are specified, as mainly a coating material. Furthermore, JP-A- 56-76148 discloses a copolymer emulsion of an olefinically unsaturated compound and a polymerizable diacetylacetic acid ester (e.g., diacetylacetic acid allyl ester). Also, JP-B-3-66322 (the term "JP-B" as used herein means an "examined published Japanese patent application") discloses a copolymer of an acetylacetoxyalkyl allyl ether [e.g., (2-acetylacetoxy-propyl) allyl ether] and other copolymerizable monomer.

However, in any of the above-described patent publications, there is no disclosure on an ethyl-vinyl ester copolymer emulsion of a specific composition obtained by copolymerizing a specific amount of an acetoacetyl group-containing polymerizable monomer, and in particular, there is no disclosure on that the copolymer emulsion has a specific toluene-insoluble content and also the copolymer emulsion using a specific amount of polyvinyl alcohol as a protective colloid is preferred. Also, there is no description on use of the copolymer emulsion as adhesives requiring a high water resistance.

SUMMARY OF THE INVENTION

Under the above circumstances, an object of the present invention is to overcome the problems of the conventional techniques described above and to provide an aqueous emulsion type adhesive having excellent water resistance.

In the present invention, the term "water resistance" means that the adhesive has a strong resistance to not only the contact with water but also to a more severe condition, such as the contact with warm water or hot water.

As the result of various investigations to achieve the above object, the inventors have found that the object can be achieved in the case of using a copolymer containing an ethylene monomer unit (A), a vinyl ester monomer unit (B), and an acetoacetyl group-containing copolymerizable monomer unit (C) as essential structural units in a specific range of the proportion of each structural unit. The present invention has succeeded in accomplishing the present invention based on this finding.

The present invention provides an adhesive comprising an aqueous emulsion of a copolymer containing an ethylene monomer unit (A), a vinyl ester monomer unit (B), and an acetoacetyl group-containing copolymerizable monomer unit (C) in a weight ratio of (A)/(B)/(C)=(5 to 70)/1000/(0.1 to 10).

DETAILED DESCRIPTION OF THE INVENTION

The present invention is described in detail below.

The copolymer used in the present invention contains an ethylene unit (A), a vinyl ester unit (B), and an acetoacetyl group-containing copolymerizable monomer unit (C) as the essential structural units in the weight ratio of (A)/(B)/(C)= (5 to 70)/100/(0.1 to 10).

Specific examples of the vinyl ester unit (B) are vinyl acetate, vinyl propionate, vinyl pivalate, vinyl isononanoate, and vinyl versatate. Those may be used alone or as a mixture thereof. Of these monomers, vinyl acetate or a mixture of vinyl acetate and other vinyl ester is preferred.

Specific examples of the acetoactyl group-containing copolymerizable monomer unit (C) are acetoacetic acid vinyl ester, acetoacetic acid allyl ester, diacetoacetic acid allyl ester, acetoacetoxyethyl methacrylate, acetoacetoxyethyl acrylate, acetoacetoxypropyl methacrylate, acetoacetoxypropyl acrylate, and (2-acetylacetoxypropyl) allyl ether. Those may be used alone or as a mixture thereof.

It is an important condition in the present invention that the weight ratio of the ethylene unit (A), the vinyl ester unit (B), and the acetoacetyl group-containing copolymerizable monomer unit (C) is in a specific range, that is, (A)/(B)/(C)=(5 to 70)/100/(0.1 to 10), and preferably (A)/(B)/(C)=(5 to 55)/100/(0.5 to 5).

If the ratio of (A)/(B) is outside the above range, the sufficient water resistance which is the object of the present invention cannot be obtained. Further, if the content of the acetoacetyl group-containing copolymerizable monomer unit (C) is less than the above range, the adhesive obtained has poor water resistance. On the other hand, if the content thereof exceeds the above range, the water resistance of the adhesive becomes rather poor, and also the catalytic efficiency at the polymerization reaction for obtaining the emulsion is decreased, whereby a large amount of the catalyst becomes necessary. Further, the collapse of the emulsion occurs at the last stage of the polymerization. Those are inconvenient in the present invention.

In addition, the copolymer used in the present invention comprises the above-described structural components (A), (B), and (C) only or may further contain one or more kinds of copolymerizable monomers such as a halogenated vinyl (e.g., vinyl chloride), (meth)acrylic acid esters [e.g., 2-ethylhexyl (meth)acrylate, n-butyl (meth)acrylate, ethyl (meth)acrylate, and methyl (meth)acrylate)], maleic acid esters, crotonic acid esters, itaconic acid esters, etc., in an amount of 20% by weight or less based on the weight of the copolymer within the range of not hindering the effect of the present invention.

Furthermore, the copolymer used in the present invention can further contain one or more kinds of carboxy group-containing monomers such as acrylic acid, methacrylic acid, crotonic acid (including the half ester), itaconic acid (including the half ester), maleic acid (including the half ester), etc., and the anhydrides of these acids; N-methylol derivative monomers such as N-methylolacrylamide, N-butoxymethylolacrylamide, etc.; hydroxy group-containing monomers such as 2-hydroxyethyl (meth)acrylate, 2-hydroxypropyl (meth)acrylate, the monoallyl ether of a polyhydric alcohol, etc.; amino group-containing monomers such as dimethylaminoethyl methacrylate, dimethylaminopropyl acrylate, etc.; amido group-containing monomers such as glycidyl (meth)acrylate, acrylamide, methacrylamide, maleinamide, etc.; sulfonic group-containing monomers such as sodium vinylsulfonate, sodium methacrylsulfonate, etc.; polyvinyl compounds such as diallyl phthalate, triallyl cyanurate, triallyl isocyanurate, ethylene glycol diacrylate, allyl methacrylate, adipic acid diacrylate, trimethylolpropane dimethacrylate, etc., in an amount of 10% by weight or less based on the weight of the copolymer for the purpose of improving various properties such as water resistance, solvent resistance, weather resistance, heat resistance, etc.

The copolymer used in the present invention contains toluene-insoluble content in an amount of preferably from 10 to 80% by weight, and more preferably from 20 to 80% by weight. If the toluene-insoluble content is too small, the water resistance of the adhesive is lowered and further the heat resistance such as the heat creep resistant characteristics, etc., sometimes lowers. On the other hand, if the toluene-insoluble content is too large, it sometimes happens that welding of the particles at the film formation of the emulsion becomes incomplete, forming a defective film, whereby the adhesive force becomes insufficient.

The toluene-insoluble content used herein is the amount of insoluble components recovered by filtering with a wire net of 300 mesh after extracting 1 g of the copolymer film with 100 ml of toluene at 90° C. for 2 hours.

The solid content of the aqueous emulsion of the present invention is preferably from 40 to 70% by weight, and more preferably from 50 to 65% by weight. If the solid content is too small, an excessive energy for evaporating water is required in the drying step, while if the content thereof is too large, the viscosity of the emulsion is increased to make sometimes the coating operation of the adhesive difficult.

The aqueous emulsion composition of the present invention can be produced by conventional emulsion polymerization method.

In the emulsion polymerization, one or more kinds of protective colloids, nonionic surface active agents, anionic surface active agents, and amphoteric surface active agents can be used as a particle stabilizer.

Examples of the protective colloids used are polyvinyl alcohols such as partially saponified polyvinyl alcohol, completely saponified polyvinyl alcohol, sulfonic acid-modified polyvinyl alcohol, carboxyl-modified polyvinyl alcohol, silanol group-modified polyvinyl alcohol, etc., and cellulose derivatives such as hydroxyethyl cellulose, methyl cellulose, carboxymethyl cellulose, etc.

Examples of the nonionic surface active agents used are polyethylene alkyl ether, polyoxyethylene alkylphenol ether, a polyoxyethylene-polyoxypropylene block copolymer, a polyoxyethylene fatty acid ester, and a polyoxyethylenesorbitan fatty acid ester.

Examples of the anionic surface active agents used are alkylsulfuric acid ester salts, alkylbenzenesulfonates, alkylsulfosuccinates, alkyldiphenyl ether disulfonates, polyoxyethylene alkyl sulfates, and polyoxyethylenealkylphosphoric-acid esters.

In the above particle stabilizers, it is preferred-to use the polyvinyl alcohols having a protective colloid function alone or use the polyvinyl alcohols together with the surface active agent. In addition, in the case of using the polyvinyl alcohols, the amount of the polyvinyl alcohols used is preferably from 1 to 10 parts by weight per 100 parts by weight of the vinyl ester unit (B). If the amount thereof is too small, the adhesion of the adhesive is decreased, while if the amount is too large, the water resistance of the adhesive sometimes decreases.

When the adhesive of the present invention is prepared using the aqueous emulsion composition described above, various kinds of thickeners, inorganic fillers, thermoplastic polymer emulsions other than the emulsion of the present invention, thermosetting polymers, film-forming aids, plasticizers, dispersing agents, wetting agents, defoaming agents, organic solvents, etc., can be used as a mixture with the aqueous emulsion composition of the present invention.

The adhesive of the present invention comprising the aqueous emulsion described above is excellent in not only the resistance to water but also the resistance to warm water and hot water, and can be used for wide kind of materials. Hence the adhesive can be most suitably used for adhering water absorptive materials, such as woods, papers, etc., each other and also adhering a water absorptive material and a plastic material (film or molding).

The adhesive of the present invention having such excellent characteristics can be used in various fields, e.g., adhesives for materials for architecture, such as floor materials, joint plates for fittings, etc., adhesives for furniture, adhesives for plastic/paper lamination, etc.

In addition, the aqueous emulsion used in the present invention can be also used as a raw material for a mortar blend, a paper processing agent, and a fiber processing agent in addition to the use as the main component for the excellent adhesive as described above.

The present invention is explained in more detail by the following examples. Unless otherwise indicated, all parts, percents, ratios and the like are by weight.

EXAMPLE 1

Into a 5 liter hight pressure autoclave equipped with a stirrer were added 1,500 ml of ion exchanged water, 100 g of polyvinyl alcohol having a degree of saponification of 88 mol % and a degree of polymerization of 500 (Kuraray Poval-205, trade name, made by Kuraray Co., Ltd.), 1,940 g of vinyl acetate, 19 g of acetoacetic acid allyl ester, 3 ml of acetic acid, and 4 ml of a 1% aqueous solution of ferrous sulfate. After supplying 200 g of ethylene into the autoclave, the temperature of the mixture was raised to 65° C. 300 ml of 1% hydrogen peroxide and 80 ml of 10% Rongalite were then successively added thereto over a period of 5 hours to conduct polymerization. After conducting aging reaction at 65° C. for one hour, the product obtained was cooled and the unreacted ethylene gas was removed from the emulsion formed by applying a vacuum treatment to obtain an aqueous emulsion composition.

The aqueous emulsion composition thus obtained contained 53.7% (as solid content) of the copolymer of ethylene unit/vinyl acetate unit=8.7/100 by weight ratio, and acetoacetic acid allyl ester unit/vinyl acetate unit=1/100 by weight ratio.

An adhesive was prepared by mixing 100 g of the aqueous emulsion composition thus obtained with 6 g of toluene. The adhesive obtained was evaluated as follows.

A complete water resistance guaranteed plywood (JASS 1 class, the 1st grade product, thickness 3 mm, 3 plys) made by Niigata Goohan Shinko K.K. was cut into the size of 15 cm×15 cm. After uniformly coating 3 g of the emulsion (toluene-thickened product) on the plywood (the coated amount was about 130 g/m$^2$), a foamed polyethylene sheet was immediately placed thereon, a load of 50 kg was applied onto the sheet, and the assembly was subjected to a press curing treatment at room temperature for one week to prepare a test piece. The evaluation methods were as follows.

Boiling Water Resistance Test

The test piece was cut into the size of 7 cm×7 cm, immersed in boiling water for 4 hours, dried at 60° C. for 20 hours, immersed again in boiling water for 4 hours, and dried at 60° C. for 3 hours. The appearance (swell) and the interfacial peeling ratio of the test piece thus treated were evaluated.

Peeling Test

The foamed polyethylene sheet on the test piece was cut into a one-inch width, the test piece obtained was immersed in boiling water for 4 hours, and then cooled by immersing water at room temperature. On the wet test piece after cooling, the peeling strength at an angle of 180° at a tensile speed of 100 mm/minute and the breakage position were evaluated with an autograph manufactured by Shimazu Corporation.

The results obtained are shown in Table 1 below.

EXAMPLES 2 TO 9 AND COMPARATIVE EXAMPLES 1 TO 7

The same procedure as in Example 1 except that the conditions shown in the following tables were employed was followed, and the samples thus obtained were also evaluated as in Example 1.

The results obtained are shown in the table below.

TABLE

|  | Examples | | | | | | | | | Comparative Examples | | | | | | |
|---|---|---|---|---|---|---|---|---|---|---|---|---|---|---|---|---|
|  | 1 | 2 | 3 | 4 | 5 | 6 | 7 | 8 | 9 | 1 | 2 | 3 | 4 | 5 | 6 | 7 |
| Colpolymer Structural unit (wt %) | | | | | | | | *7 | | | | | | | | |
| (A)*1 | 8.7 | 19.0 | 47.1 | 8.7 | 8.7 | 8.7 | 8.7 | 9.1 | 8.7 | 8.7 | 8.7 | 8.7 | 0 | 3.1 | 8.7 | 8.7 |
| (B)*2 | 100 | 100 | 100 | 100 | 100 | 100 | 100 | 100 | 100 | 100 | 100 | 100 | 100 | 100 | 100 | 100 |
| (C)*3 | 1.0 | 1.0 | 1.0 | 0.5 | 4.0 | 1.0 | 1.0 | 1.0 | 1.0 | 0 | 0.05 | 15 | 1.0 | 1.0 | 0 | 0.05 |
| Particle stabilizer*4 | A | A | A | A | A | A | A | A | B | A | A | A | A | A | C | B |
| Toluene-insoluble content (wt %) | 55 | 52 | 70 | 53 | 65 | 60 | 52 | 67 | 3 | 48 | 48 | — | 35 | 40 | 33 | 3 |
| Solid Content (wt %) | 54.0 | 56.1 | 60.4 | 53.9 | 54.7 | 53.9 | 54.0 | 54.1 | 54.1 | 53.8 | 53.8 | —*8 | 52.2 | 52.9 | 53.8 | 53.8 |
| Evaluation Boiling water resistance test | | | | | | | | | | | | | | | | |
| Swelling*5 | A | A | A | A | A | A | B | A | B | D | C | — | D | D | C | D |
| Interfacial peeling ratio (%) | 6 | 5 | 6 | 8 | 6 | 5 | 10 | 6 | 15 | 80 | 48 | — | 100 | 60 | 45 | 80 |
| Peeling Test | | | | | | | | | | | | | | | | |
| Breakage position*6 | A | A | A | A | A | A | A | A | A | B | B | — | B | B | B | B |
| Peeling strength (kg/inch) | 1.4 | 1.5 | 1.4 | 1.3 | 1.4 | 1.4 | 1.3 | 1.4 | 1.1 | 0.6 | 0.7 | — | 0 | 0.7 | 0.8 | 0.5 |

*1 Ethylene
*2 Vinyl acetate. However, in Example 6, 65% by weight of vinyl acetate and 35% by weight of Veova-10 (Versatic acid vinyl ester, made by Shell Chemical Co.) were used.
*3 Acetoacetic acid allyl ester. However, in Example 7, acetoacetoxyethyl methacrylate was used.
*4:
A: Kuraray Poval 205 (polyvinyl alcohol having a degree of saponification of 88 mol% and a degree of polymerization of 500, made by Kuraray Co., Ltd.)
B: Emulgen (polyethylene oxide nonyl ether type nonionic surface active agent, made by Kao Corporation)
C: Gohsefimer-Z-210 (acetoacetylated polyvinyl alcohol, made by Nippon Gohsei K.K.)
*5:
A: None
B: Swelled a little
C: Swelled
D: Swelled greatly
*6:
A: Foamed polyethylene was broken.
B: The interface between the plywood and the adhesive was broken.
*7 As the structural components for the copolymer, a copolymer containing 4.6% by weight of 2-ethylhexyl acrylate was used in addition to the components shown in the table.
*8 At the final stage of the polymerization, the collapse of the emulsion occurred.

From the results shown in the above table, the following will be apparent.

The samples of the Examples according to the present invention each satisfying the conditions of the present invention show the satisfactory results in all the evaluation items. On the other hand, the samples of Comparative Examples 1 and 6 lacking in the component (C), the samples of Comparative Examples 2 and 7 wherein the amount of the component (C) is too small, the sample of Comparative Example 3 wherein the amount of the component (C) is too large, the sample of Comparative Example 4 lacking in the component (A), and the sample of Comparative Example 5 wherein the amount of the component (A) is too small are poor in all the evaluation items.

While the invention has been described in detail and with reference to specific embodiments thereof, it will be apparent to one skilled in the art that various changes and modifications can be made therein without departing from the spirit and scope thereof.

What is claimed is:

1. An adhesive comprising an aqueous emulsion of a copolymer containing an ethylene unit (A), a vinyl ester unit (B), an acetoacetyl group-containing copolymerizable monomer unit (C) and a polyvinyl alcohol as a protective colloid (D) in a weight ratio of (A)/(B)/(C)/(D)=8.7 to 70/100/0.1 to 10/1 to 10, wherein said copolymer contains a toluene-insoluble content in an amount of from 52 to 70% by weight.

2. The adhesive of claim 1, wherein the vinyl ester unit (B) is at least one member selected from the group consisting of vinyl acetate, vinyl propionate, vinyl pivalate, vinyl isononanate, and vinyl versatate.

3. The adhesive of claim 1, wherein the vinyl ester unit (B) is vinyl acetate.

4. The adhesive of claim 1, wherein the acetoacetyl group-containing polymerizable monomer unit (C) is at least one member selected from the group consisting of acetoacetic acid vinyl ester, acetoacetic acid allyl ester, diacetoacetic acid allyl ester, acetoacetoxyethyl methacrylate, acetoacetoxyethyl acrylate, acetoacetoxypropyl methacrylate, acetoacetoxypropyl acrylate, and (2-acetylacetoxypropyl) allyl ether.

5. The adhesive of claim 1, wherein the weight ratio of the ethylene unit (A), the vinyl ester unit (B), and the acetoacetyl group-containing copolymerizable monomer unit (C) is (A)/(B)/(C)=8.7 to 55/100/0.5 to 5.

6. The adhesive of claim 1, wherein the aqueous emulsion contains a solid content in an amount of from 40 to 70% by weight.

7. The adhesive of claim 6, wherein the content of the solid content is from 50 to 65% by weight.

8. The adhesive according to claim 1, wherein said ethylene unit (A) is present in an amount of 8.7 to 47.1 parts by weight per 100 parts by weight of said vinyl ester unit (B).

* * * * *